United States Patent Office 2,849,329
Patented Aug. 26, 1958

2,849,329
PROCESS OF PREPARING WATER-INSOLUBLE COLORING MATTERS

Oskar Braun, Frankfurt am Main, Germany, assignor to Farbwerke Hoechst Aktiengesellschaft vormals Meister Lucius & Brüning, Frankfurt am Main, Germany, a corporation of Germany No Drawing. Application June 7, 1955
Serial No. 513,911

Claims priority, application Germany December 12, 1952

5 Claims. (Cl. 106—308)

The present invention relates to a process for the manufacture of water-insoluble coloring matters, particularly of water-insoluble azo dyestuffs having a soft grain.

It is already known to prepare azo-dyestuffs by adding emulsifiers, such as, for instance, Turkey red oil, during the coupling. Inasfar as the Turkey red oil still contains slight amounts of oil originating from its manufacture, these amounts are, to a large extent, washed out with water when the produced dyestuff is washed out so that the latter no longer contains any amounts of oil worth mentioning. Additional oil, however, has hitherto not yet been used. The dyestuffs produced in the presence of emulsifiers are of a very hard grain. If the dyestuffs are present in a finely dispersed state, they show a particular tendency of forming dust.

Now I have found that in the manufacture or working up of water-insoluble coloring matters, particularly of water-insoluble azo-dyestuffs, special advantages are attained by adding an aqueous emulsion of an oil or a mixture of an emulsifying agent and an oil, at any stage during the manufacture, to an aqueous liquid in such a quantity that the portion of oil amounts to more than about 3 percent calculated upon the dyestuff powder of 100 percent strength, and preferably to 10–25 percent. By increasing the portion of oil to 10–25 percent, powders of a still softer grain are generally produced than they are obtained when smaller portions of oil are used. Moreover, the dyestuff powders thus obtained show an improved coloring strength.

The usual emulsifying agents are used for the preparation of the emulsions, for example, anion-active substances, such as alkyl-sulfonates of high molecular weight, alkyl-aryl sulfonates, alcohol sulfates, condensation products of fatty acids and amino- or hydroxy-alkyl sulfonic or carboxylic acids, fatty acids, sulfonated fatty acids or fatty acid derivatives or resin acids, non-ionic products, such as the addition products of varying amounts of ethylene oxide with alcohols or alkyl-phenols of high molecular weight, or cation-active products which, if desired, may be hydroxy-alkylated. Emulsifying agents may be used which are soluble in water and/or in oil. As emulsifying agents soluble in oil and in water there may be named the condensation products of alkyl sulfonamides of high molecular weight with halogen-carboxylic acids. These condensation products are distinguished by their good compatibility with oil, they are capable of taking up large amounts of oil and guarantee a sufficient stability of the emulsions. The emulsifying agents may be prepared as follows:

A fraction consisting of aliphatic hydrocarbons of high molecular weight having a boiling range of about 150° C. to 350° C. is reacted in the usual manner with sulfur dioxide and chlorine. It is of advantage to operate so that only about half of the hydrocarbon content is sulfochlorinated. The sulfo-chlorination mixture is reacted with ammonia or a primary amine, and the reaction product is condensed with a halogen-carboxylic acid. There can be obtained in this manner alkyl-sulfonamido-carboxylic acids of high molecular weight or mixtures thereof which contain a large amount of unaltered hydrocarbons, and also portions of sulfonamides and alkyl-sulfonic acids and a small amount of alkyl-disulfonic acid salts, disulfonamides, alkyl-sulfonamido-diacetic acid salts, alkyl-disulfonamido-acetic acid salts and alkyl-disulfonamido-diacetic acid salts. It is of advantage to use alkyl-sulfonamido-acetic acids or mixtures of alkyl-sulfonamido-acetic acids of high molecular weight obtained during the afore-described reaction or the salts thereof of inorganic or organic bases, for example the sodium-, potassium-, ammonium-, triethanol-amine or cyclo-hexylamine-salts.

Instead of using an aqueous emulsion of an oil, it is, of course, also possible to prepare a mixture of an emulsifying agent and an oil and to add it to the liquid at any stage of the manufacture. It may be of advantage previously to clarify the mixture, if it is not already clear. For clarifying the mixture, a solution promoter may be used, for example, water; a fatty acid of high molecular weight, such as olein; an alcohol, such as butanol; or an aliphatic carboxylic acid of low molecular weight, such as acetic acid. Since part of the oil is washed out during the filtration, about 5 to about 33 percent of oil, calculated upon 100 percent of the quantity of dyestuff powder have to be used, so that the finished dyestuff powder contains about 3–25 percent of oil.

The aqueous emulsion of an oil or the mixture of emulsifying agent and oil may be added at any stage during the manufacture of the dyestuff or when it is worked up. It is of special advantage to add the emulsions of oil or the mixtures of emulsifying agent and oil during the coupling.

It is also possible to prepare the emulsions by one of the so-called pasting methods by using an aqueous solution of an emulsifying agent, and slowly adding an oil thereto, while stirring, the additions of oil being made only after previously introduced portions of oil have become intimately combined with the solution. In order to facilitate this procedure, a small amount of water may be added from time to time. The paste so obtained may be adjusted to the desired concentration. The quantity of oil may vary within wide limits, for example, from 1 percent to 95 percent. When small amounts of oil are added, extremely finely dispersed colloidal emulsions are obtained which have the appearance of true solutions.

It may perhaps be assumed that during the manufacture of the coloring matter a gradual destruction of the emulsion takes place, the oil particles precipitating in a state of fine subdivision and influencing the formation of the particles of the coloring matter. In some cases it may be advantageous to add an electrolyte (a salt or an acid).

As oils there come into consideration, for example, fatty oils, such as peanut oil, linseed oil, maize grain oil and others and also mineral oils or synthetic oils, for example, from the Fischer-Tropsch synthesis.

As water-insoluble coloring matters there may be mentioned, for example, inorganic pigments, such as cadmium yellow, cadmium red, chrome yellow, chromium oxide green, zinc carbonate, yellow iron oxide, red iron oxide and the like; organic pigment dyestuffs, such as pyrazolone and other azo-pigment dyestuffs; and also indigoid and anthraquinoid vat dyestuffs or dyestuffs which have been precipitated with precipitating agents in a water-insoluble form, for example with barium chloride or with complex phosphomolybdo-tungstic acids.

The water-insoluble coloring matters of the invention have a pronounced soft grain, and therefore do not, in general, require a special grinding treatment, and can be converted by manual or simple mechanical disintegration into a powder which is free from hard particles.

Owing to the high degree of softness of the powder and the fine state of subdivision of the coloring matter, the products are well suited for a further working up, for instance for incorporation in drying oils, lacquers, thickening agents for printing, offset-printing inks or thermoplastic materials. Remarkable tinctorial advantages are obtained, for example increased coloring power, in spite of the high portion of oil contained therein, brighter tints, improved fastness properties, such as fastness to oils and solvents and also freedom from specks. Owing to the ease and uniformity with which they can be distributed, the colored powders and pastes can be worked up with special advantage in aqueous or oily media, for example, in the manufacture of wallpaper and colored paper or for producing pigment dyeings on textile materials. Moreover, they can be used in anhydrous media, for example, in the manufacture of color lakes by the dry grinding method in an edge runner mill, for grinding with oils for graphic purposes, for pigmenting of nitrocellulose lacquers, for coloring artificial and natural thermoplastic materials, and other purposes in combination with the additions required for dyeing caoutchouc etc.

Owing to the incorporation of the high portion of oil into the powdered coloring matter during its preparation, the tendency of dusting is further diminished than is the case when smaller portions of oil are used. As is known, the introduction into practice of pulverized dyestuff brands often meets with difficulties because, when they are worked up, the workmen are disturbed by the most disagreeable dusting action of these dyestuffs. It is remarkable that the powdered dyestuffs of the present invention can readily be worked up and ground even if they have a high content of oil up to 25 percent (calculated on a dyestuff powder of 100 percent strength). A smearing is not observed.

The high content of oil is particularly favorable in working up processes in which oils, varnishes or factices are simultaneously used for triturating the pulverized dyestuff. In this case the pulverized coloring matters of the present invention are likewise superior to the powders having a low content of oil. Owing to the content of oil, the absorption of oil is essentially smaller on triturating the coloring matter; the quantity of oil and varnish saved is often larger than that corresponding to the actual content of oil of the powder.

The following examples illustrate the invention, the parts being by weight:

*Example 1*

90 parts of a mixture consisting of 23.5 parts of sodium alkyl-sulfonamido-acetate, 75 parts of mineral oil and 6.9 parts of water in the form of an aqueous emulsion of 10 percent strength are added to a coupling solution obtained from 216 parts of 1-phenyl-3-methyl-5-pyrazolone and 6 parts of 1-phenyl-3-carbethoxy-5-pyrazolone. After the addition of chalk, a tetrazo-solution, obtained from 153 parts of 3.3′-dichloro-4.4′-diamino-diphenyl, is then run at 25° C. into the mixture. When the coupling is finished, the coupling liquor is rendered acid to Congo paper. The solution is then boiled for 1 hour, filtered, the filter residue is washed and dried at 60° C. The oil emulsion may also be added before or after the acidification or boiling. When the addition is made during the coupling, about 3 percent of coupling component are saved, in comparison with a coupling operation carried out without the afore-named addition.

By the procedure described above an extremely soft grain is obtained. The powder contains 12 to 17 percent of oil. The consumption of oil of a powder thus obtained, for instance on triturating it with linseed oil, is by about 25 percent smaller than that of a dyestuff powder prepared without the addition of a mixture of emulsifying agent and oil. According to the process described, the yield is about 12 to 17 percent higher, owing to the content of oil of the powder, than without these additions. It is a surprising fact that these dyestuff powders, though they show a content of coloring matter between 83 and 88 percent, in comparison with the powders of substantially 100 percent strength, but free from oil, yield stronger orange tints on caoutchouc. The fastness of vulvanization of the new pulverized coloring matters on dyeing caoutchouc, in combination with factices and the usual additions is distinctly better than without an addition. A further great advantage of these powders is the essentially reduced dusting action when they are worked up and the small loose weight which is reduced by about 25 percent.

By using a still higher quantity than that named above of the mixture of emulsifying agent and oil, for example 110 parts instead of 90 parts, the tendency of dusting of the dyestuff powder obtained is still somewhat reduced.

Sodium alkyl-sulfonamido-acetate is obtained as follows:

A hydrocarbon fraction obtained from a Fischer-Tropsch synthesis and boiling between 220° C. and 320° C. is treated in the usual manner with sulfur dioxide and chlorine until about half of the hydrocarbon content has been converted into sulfochlorides. The sulfochlorination mixture is treated with ammonia. The mixture of sulfonamides is then condensed with chloracetic acid. By the neutralization a product is obtained which contains a considerable quantity of unaltered hydrocarbons and a small quantity of alkyl-sulfonamide, alkyl-sulfonimide and sodium alkyl sulfonate in addition to sodium alkyl-sulfonamido-acetate.

*Example 2*

A dyestuff is prepared by tetrazotizing 102 parts of 3.3′-dichloro-4.4′-diaminodiphenyl and coupling the tetrazotized product with 200 parts of 1-phenyl-3-carbethoxy-5-pyrazolone in the presence of chalk at a temperature of 50° C. Before the coupling, 70 parts of a mixture consisting of 23.5 parts of sodium alkyl-sulfonamido-acetate, 75 parts of spindle oil and 6.9 parts of water in the form of an aqueous emulsion of 10 percent strength are caused to run into the coupling component. When the coupling is finished, the coupling liquor is rendered acid to Congo paper, the solution is boiled for 1 hour, filtered, the filter residue is washed with hot water and dried at 60° C.

The addition can also be made during the coupling operation, i. e. before the acidification with hydrochloric acid or after the boiling process.

If required, the quantity of the mixture of emulsifying agent and oil may be increased.

By the procedure described a loose dyestuff powder having an extremely soft grain is obtained. The powder contains up to 20 percent of oil. Whereas the yield, without these additions, is at 294 parts of dyestuff, 350 parts of dyestuff are obtained by the process of the present invention, i. e. the yield is increased by about 16 percent. Though the content of pure coloring matter of these powders is only between 82 and 84 percent, there are obtained, after the powder together with the additions required have been worked into a caoutchouc on a roller and the mixture has been vulcanized, purer red tints of a higher tinctorial strength than with a powder of substantially 100 percent strength which was prepared without the addition of a mixture of emulsifying agent and oil. The tendency for the devolpment of dust is very much reduced; the loose weight is by about 20 percent smaller than that of powders of 100 percent strength. The advantages described herein cannot be attained with oils only, i. e. in the absence of emulsifying agents.

By triturating 150 parts of the pulverized coloring matter obtained with 200 parts of varnish on the roller mill, a more flexible printing paste is obtained than when using the same quantity of a pulverized coloring powder containing no addition of emulsifying agent and oil, even if in said powder the quantity of varnish would be increased to 250 parts. In order to attain substantially the same ductility of the printing pastes, the ratio between varnish and pulverized coloring matter in the dyestuff powders obtained by the process of the present invention may be reduced to 1:1, whereas the ratio in non-prepared powders of 100 percent strength is 2 parts of varnish to 1 part of coloring matter. A considerable amount of varnish is thus saved.

*Example 3*

The quantity of the mixture of emulsifying agent and oil as it is mentioned in Example 2 is added to a coupling solution consisting of 165 parts of 1-tolyl-3-methyl-5-pyrazolone. After the addition of chalk, a tetrazo-solution consisting of 103 parts of ortho-dianisidine is caused to run at 10° C. to 12° C. into the coupling component. As soon as the coupling is complete, the mixture is rendered acid to Congo paper, heated to boiling, boiled for 1 hour, filtered and the filter residue is washed with hot water and dried at 60° C.

A dyestuff powder is obtained having similar properties as that described in Example 2.

About 40 percent of packing space is saved.

*Example 4*

A dyestuff is prepared by diazotizing 487.3 parts of 1-amino-3-methyl-4-chlorobenzene-6-sulfonic acid and coupling the diazotized compound with 326 parts of beta-naphthol at a pH value between 8.5 and 12 and at a temperature of 20° C. When the coupling is complete, the mass is filtered and the moist press cakes are introduced into 6 litres of water and the whole is stirred for 2–3 hours. The solution is rendered neutral to delta-paper by means of hydrochloric acid and stirring is continued for 3–4 hours. 226 parts of a mixture of oil and emulsifying agent prepared from 53.8 parts of sodium alkyl-sulfonamido-acetate (obtained by partial sulfochlorination) 160.5 parts of spindle oil and 11.7 parts of water are then caused to run in, in the form of an aqueous emulsion of 10 percent strength. The mixture is heated to 75° C. and caused to flow into a mixture heated to 95° C. and consisting of 28 litres of water, 1160 grams of sodium chloride and 380 grams of barium chloride. The mixture is maintained for 1 hour at 95° C., then cooled to 80° C., filtered and washed for a short time. The press cake is dried at 60° C. to 65° C.

By the method of operating described a dyestuff is obtained having a much softer grain and an essentially smaller dusting action than when processing without an emulsifying agent as addition. The increase in yield amounts to 13–14 percent. The dried powder contains as an average 13 percent of mineral oil in addition to small portions of emulsifying agent. By the essentially increased specific gravity, in comparison with a dyestuff prepared without the addition of a mixture of emulsifying agent and oil, about 50 percent of the packing material can be saved and a highly increased output of grinding is attained.

The dyestuff powder of about 86 percent strength prepared as prescribed shows, when worked into caoutchouc on the roller together with the additions required and after the vulcanization of the mixture, somewhat fuller and purer red tints, than a non-prepared powder.

*Example 5*

A mono-azo-dyestuff is prepared by diazotizing 93.5 parts of aniline and coupling the diazotized product with 146 parts of alpha-naphthylamine. The dyestuff is further diazotized and analysis of the diazo value is then carried out which in most cases shows a yield of 0.75 mol ($=75$ percent. of the theoretical yield). The product is then coupled with a quantity of acetonyl-1.8-naphthylene-diamine equivalent to the analytically found value of the diazo compound, in most cases 135 parts, so as to obtain the diazo-dyestuff. The reaction mixture is stirred overnight. There is then added a stable aqueous emulsion of about 10 percent strength of 83.3 parts of a mixture consisting of 25 parts of sodium alkyl-sulfonamido-acetate (obtained by partial sulfochlorination), 75 parts of mineral oil and 5.4 parts of water. The batch is heated to 50° C., stirring is continued for 30 minutes and the mixture is then rendered alkaline to phenolphthalein by means of sodium hydroxide solution. The dyestuff is then filtered, washed until neutral and dried at 60° C.

When operating in the afore-described manner, the dyestuff is obtained, after drying, in the form of pieces of a soft grain which may be used in various fields in combination with solvents, for example in the form of a black nitrocellulose lacquer; a previous grinding is unnecessary, this involving the advantage that a disturbance by dust does practically not occur. The ground dyestuff, too, shows a much smaller development of dust in comparison with a dyestuff prepared without the addition of a mixture of oil and emulsifying agent. The dyestuff obtained by the afore-described process contains between 14 and 18 percent. of oil. The increased yield is likewise within the range of 14 to 18 percent. In stearin-paraffin a black color of a somewhat more bluish and a purer tint is produced than is the case with a dyestuff prepared without the addition of oil.

Instead of the mixing proportion of 25 parts of sodium alkyl-sulfonamido acetate, 75 parts of spindle oil and 5.4 parts of water, it is, of course also possible to apply other mixing proportions, in which for example, the portion of emulsifying agent is higher and that of the oil is correspondingly lower, such as a mixture of 60 parts of sodium alkyl-sulfonamido acetate (obtained by partial sulfochlorination), 40 parts of spindle oil and 15 parts of water. With the same success the tri-ethanol salt or the hexyl-amine salt may be used instead of the sodium salt.

*Example 6*

A dyestuff is prepared by diazotising 352 parts of 2-chloro-4-nitraniline and coupling the diazotized product with 300 parts of beta-naphthol. When the coupling is complete the coupling liquor having an acid reaction to Congo paper is mixed with an aqueous emulsion of 10 percent. strength of 149 grams of a mixture of oil and emulsifying agent consisting of 35.3 parts of sodium alkyl-sulfonamido acetate (obtained by partial sulfochlorination), 106 parts of mineral oil and 7.7 parts of water. The mixture is stirred for 30 minutes, and filtered and the dyestuff obtained is washed until the washing water has a neutral reaction to delta paper; the press cakes are dried at 60° C.–65° C.

By the afore-described method of operating an extremely soft powder is produced containing about 14 to 17 percent. of mineral oil and small portions of emulsifying agent. A powder thus obtained can readily be worked into linseed oil and substantially no disturbing action of dust can be noticed. When mixing it with zinc oxide, a dyestuff powder of about 86 percent. strength prepared as described above produces practically the same strong colorations as a dyestuff powder of 100 percent. strength but prepared without the addition of oil.

*Example 7*

4 parts of a mixture concentrate consisting of 60 parts of sodium alkyl-sulfonamido-acetate (obtained by partial sulfo-chlorination), 40 parts of spindle oil and 15 parts of water are added to a coupling solution obtained from 200 parts of 1-phenyl-3-carbethoxy-5-pyrazolone which also contains chalk. A tetrazo-solution, obtained from 102 parts of 3.3'-dichloro-4.4'-diamino-diphenyl, is then run at 50° C. into the mixture. The aforesaid quantity of the concentrate may also be added during the coupling operation.

When the coupling is finished, the coupling liquor is rendered acid to Congo paper, and a further 4 parts of the aforesaid mixture of emulsifying agent and oil are added. The solution is then boiled for 1 hour, filtered, the filter residue is washed with hot water and dried.

It is, for example, also possible to add about 6 parts of the concentrate during the coupling operation so that a further addition during the boiling can then be dispensed with, or the concentrate need only be added during the boiling operation. Instead of the aforesaid concentrate a corresponding quantity of an aqueous emulsion, for example, of 20 percent. strength, may be used.

Sodium alkyl-sulfonamido-acetate is obtained as follows:

A hydrocarbon fraction obtained from a Fischer-Tropsch synthesis and boiling between 220° C. and 320° C. is treated in the usual manner with sulfur dioxide and chlorine until about half of the hydrocarbon content has been converted into sulfochlorides. The sulfo-chlorination mixture is treated with ammonia. The mixture of sulfonamides formed is then condensed with chloracetic acid. By the neutralization a product is obtained which contains a considerable quantity of unaltered hydrocarbons and small quantity of alkyl-sulfonamide and sodium alkyl sulfonate in addition to sodium alkyl-sulfonamido-acetate.

By the procedure described above an extremely soft powder is obtained, which, even without grinding, and only after manual pulverization and sifting, when incorporated with rubber together with the usual additions on rollers and after vulcanization yields strong pure red tints.

Instead of the aforesaid mixture of 60 parts of alkyl-sulfonamido-acetic acid (obtained by partial sulfo-chlorination) and 40 parts of spindle oil, a product may be used which contains no addition of oil. As stated above the alkyl-sulfonamido-acetic acid prepared in the manner described, has a considerable content (about 40–50 percent) of hydrocarbon oils.

Coloring matters can be prepared with the above named azo-dyestuff with the same result by using during the coupling operation 12 parts of a mixture which consists of 25 parts of a condensation product of dodecyl phenol with 8 mols of ethylene oxide and 75 parts of mineral oil (clarified with water and olein).

The above coloring matter can be obtained equally successfully in the form of a very soft powder by adding to the coupling component 4 parts of a mixture (clarified with water, olein and butanol) of 2.6 parts of oleic acid methyl tauride and 75 parts of mineral oil. As soon as the coupling has been finished, the coupling liquor is rendered acid to Congo paper, and a further 8 parts of the aforesaid mixture are added. The mixture is then boiled for 1 hour and filtered, and the filter residue is washed with hot water and dried.

The mixture described above may also be used in the form of an emulsion, for example, of 10 percent strength.

*Example 8*

A dyestuff is prepared by diazotizing 77.5 parts of 1-amino-2-methoxybenzene-5-sulfonic acid diethyl-amide and coupling the diazotized product with 113 parts of 2.3-hydroxy-naphthalene-carboxylic acid-2'.4'-dimethoxy-5'-chloranilide at a temperature between 20° C. and 25° C. and at a pH value between 3.8 and 4.6.

Before the coupling, 9 parts of the above mentioned sodium alkyl-sulfonamido-acetate are added, without a special addition of oil, to the diazo-solution which is feebly acid to Congo paper. As soon as the coupling is complete, the mixture is heated to 40° C.–50° C., filtered, and the filter residue is washed well, and dried. A very loose, soft powder is obtained which, when triturated with oil, yields after dilution surface colorings having extremely pure pink tints of high strength, and which, when used as an undiluted paint, has a good covering power, and depending on the temperature used for drying can be regulated, as desired, so as to yield weaker or stronger tints. In coloring thermoplastic materials, the purity of the tint is also remarkable.

By increasing the quantity of the aforesaid sodium alkyl-sulfonamido-acetate to, for example, 18 parts, the powder becomes still softer and the tint becomes brighter.

Instead of sodium alkyl-sulfonamido-acetate (obtainable by partial sulfo-chlorination) without the addition of oil, 9 parts of a mixture of 60 parts of the aforesaid sodium salt and 40 parts of mineral oil may be used. Furthermore, there may be used a clarified concentrate which consists, for example, of 15 parts of an oleic acid methyl-taurine of 30–40 percent strength and about 85 parts of mineral oil.

With the same success a clarified mixture of emulsifying agent and oil may be used which consists of 25 parts of isooctylphenyl-polyglycol ether (6.5 mols of ethylene oxide) and 75 parts of mineral oil.

*Example 9*

A dyestuff is prepared by diazotizing 48.4 parts of 1-amino-2-methoxy-5-benzoic acid anilide, and coupling the diazo-compound so obtained with 70.8 parts of 2.3-hydroxy-naphthalene-carboxylic acid-3'-nitranilide at 15° C., while adjusting the pH value to 3.8–4.5.

Before the coupling, there are added to the alkaline solution of the coupling component before the precipitation or to the acid precipitating bath, before or after the addition of the acid, 10 parts of a mixture consisting of:

80 parts of the aforesaid sodium alkyl-sulfonamido-acetate
20 parts of mineral oil and
12 parts of water in the form of an aqueos emulsion of 20 percent strength. As soon as the coupling has finished, the product is separated by filtration and thoroughly washed and dried. An extremely soft dyestuff powder is obtained which, when merely rubbed by hand even without grinding, yields pure claret tints of a high coloring strength when used as a paint in combination with a drying oil. When incorporated in rubber with the necessary additions there are obtained, after vulcanization, rubber colorings of extremely high coloring strength and very flowery tints.

Instead of the sodium salt of alkyl-sulfonamido-acetic acid, salts of other inorganic or organic bases may be used, for example, the potassium, ammonium, triethanolamine or cyclohexylamine salt. The proportion of the mineral oil may be reduced or increased.

*Example 10*

A dyestuff is prepared by diazotizing 30.3 parts of 1-amino-2-methyl-5-nitrobenzene, and coupling the diazotized product with 62.5 parts of 2.3-hydroxy-naphthalene-carboxylic acid-4'-chloranilide at 40° C., in a caustic alkaline medium.

When dissolving the 2.3-hydroxy-naphthalene-carboxylic acid-4'-chloranilide, 5 parts of the aforesaid sodium alkyl-sulfonamido-acetate are added. As soon as the coupling is complete, the solution is rendered feebly acid to Congo paper by means of hydrochloric acid, heated to 95° C., kept at that temperature for 1 hour, filtered, and the filter residue is washed and dried.

Apart from the fact that by the aforesaid addition the solubility of the 2.3-hydroxy-naphthalene-carboxylic acid-4'-chloranilide is strongly enhanced, there is obtained in this manner an extremely loose coloring powder having a very soft grain which, even without drying of press cake at a raised temperature, yields, when applied as a paint with a drying oil, surface colorings having a good covering power, a high coloring strength and a good fastness to oil.

Still softer powders are obtained having improved fastness properties, such as fastness to oil, to solvents and to splashing, and yielding brighter tints, by carrying out the coupling at a temperature between 40° C. and 50° C. at a pH value between 4.3 and 6.5, instead of using a caustic alkaline medium. For example, a mixture, emulsified in water, of 2.3 parts of sodium dibutyl-naphthalene sulfonate and 0.4 part of sodium alkyl-sulfonamido-acetate, which still contains unaltered hydrocarbon oil, is added to the alkaline naphthol solution before the coupling and before the precipitation of the naphthol with an organic or inorganic acid.

*Example 11*

A dyestuff is prepared by diazotizing 28.6 parts of alpha-naphthylamine, and coupling the diazotized product with 46.4 parts of 1-hydroxy-naphthalene-5-sulfonic acid at a temperature between 0 and 5° C. and at a pH within a range of 1–9. The sodium salt so obtained is separated. The press cake is stirred with water, and 6 parts of the above mentioned sodium alkyl-sulfonamido-acetate are added. The solution is then rendered feebly acid to Congo paper by means of hydrochloric acid, and the whole made up with water to 1200 parts by volume. A clarified solution of 33 parts of calcium chloride in 150 parts by volume of water is then added, the mixture is stirred for ½ hour, then heated to 95° C. and maintained at that temperature for about 30 minutes. The solution is diluted with cold water to 2500 parts by volume, and filtered, and the filtered residue is washed until neutral and dried at 60° C.–70° C.

The powder so obtained has a very soft grain.

It may also be of advantage to operate as follows so as to convert the product directly into a lake without the separation of sodium salt: After the coupling, stirring is continued for 1 hour and the coupling liquor is then rendered feebly acid to Congo paper within 30–40 minutes by means of hydrochloric acid. 7 parts of an alkyl sulfonate, obtained by sulfo-chlorination of paraffin hydrocarbons of high molecular weight and subsequent hydrolysis, and still containing 24.8 percent of water, 4 percent of sodium chloride and 2.5 percent of mineral oil, are added in the form of an aqueous emulsion. A solution of 33 parts of calcium chloride in 150 parts by volume of water is then introduced, and the mixture is stirred for 30 minutes. It is heated to 95° C. and maintained at that temperature for 30 minutes. Cold water is then run in until the temperature is about 70° C.–75° C. and a sufficient quantity of chalk is added to cause the acid reaction to Congo paper to disappear, the solution is filtered, and the filter residue is thoroughly washed and dried at 60° C.–70° C.

This procedure has the great advantage of a considerable saving of time, because the addition of water to the press cake and the separate conversion into a lake is not necessary. A coloring matter so obtained has a soft grain, whereas the directly laked dyestuff has a very hard grain.

*Example 12*

200 grams of a press cake of about 19 percent strength of the condensation product from 3-hydroxy-thionaphthene and acenaphthene-quinone are made into a paste with 500 cc. of water, a further 1500 cc. of water are slowly added, while stirring, and stirring is continued for 3 hours. 7 grams of the above mentioned sodium alkyl-sulfonamido-acetate are then added, the mixture is stirred for 30 minutes, rendered acid to Congo paper with 4 cc. of 5 N-hydrochloric acid, and then heated to 80° C. and maintained at that temperature for 30 minutes. The solution is then filtered, and the filter residue is washed and dried.

An extremely loose dyestuff powder having a soft grain is obtained in this manner.

*Example 13*

300 grams of a press cake of about 37 percent strength of the condensation product from naphthalene-tetracarboxylic acid and 1-chloro-3.4-diamino-benzene are made into a paste with 500 cc. of water, the paste is stirred for one night and further 1500 cc. of water are then added. 8 grams of a mixture of 60 parts of sodium alkyl-sulfonamido-acetate, 40 parts of spindle oil and 15 parts of water are then introduced in the form of an emulsion of 20 percent strength, the whole is stirred for 30 minutes, the mixture is rendered acid to Congo paper with about 4 cc. of 5 N-hydrochloric acid, stirred for 1 hour and heated to 60° C. and maintained at that temperature for 1 hour. The solution is then filtered, and the filter residue is washed and dried at 60° C.

Instead of the mixture described above, the same quantity of sodium alkyl-sulfonamido-acetate or 12 grams of a mixture of 25 parts of a condensation product from dodecyl phenol and 8 mols of ethylene oxide and 75 parts of mineral oil (clarified with water and olein) may be used.

Very loose, soft powders are obtained in this manner which, even without being ground and only after having been pulverized by hand, wet very well and may, therefore, be used with advantage for the manufacture of printing colors for cloth printing. For example, by mixing 20 grams of this powder by stirring with the following printing thickener 70 grams of wheat starch
70 grams of water
150 grams of tragacanth 60/1000
70 grams of British gum
60 grams of water
80 grams of glycerine
120 grams of potassium carbonate
80 grams of rongalite and
280 grams of water 980 grams a printing color free from specks is obtained, which after printing, drying, steaming, oxidizing, soaping and drying, yields on cotton, rayon crêpe and staple fibre prints which are decidedly stronger in color than a printing color which has been made with a powder prepared without the aforesaid additions.

The following dyestuffs may be treated in the same manner: The condensation product from naphthalene-tetracarboxylic acid and ortho-phenylene diamine, and the dyestuff obtainable from N-benzanthronyl-pyrazole-anthrone by means of alcoholic potassium hydroxide at 100° C. In the case of dibromo-dibenz-pyrene-quinone there are advantageously used for 200 grams of the dyestuff press cake of 24 percent strength, 10 grams of a mixture of 60 parts of sodium alkyl-sulfonamido-acetate, 40 parts of spindle oil and 15 parts of water.

In all cases a loose powder is obtained having a very soft grain.

*Example 14*

The following solutions are prepared:

I. 30 grams of potassium bichromate and
    8 grams of calcined sodium carbonate dissolved in
    300 grams of distilled water.
II. 76 grams of lead acetate dissolved in
    600 grams of distilled water.

Solutions I and II are run simultaneously, while stirring, into 3 litres of distilled water. The final volume is about 4 liters. Stirring is continued for 5 minutes, the precipitate is allowed to settle, the mixture is decanted after 1 hour, the precipitate is stirred with 1 liter of water, and the solution is allowed to settle and filtered with suction, and the filter residue is rinsed with 250 cc. of water. The product is dried at 45° C.–50° C.

About 63 grams of an orange powder are obtained, 1 gram of which, when ground with about 1 cc. of boiled linseed oil and spread upon a glass plate, yields a strong reddish yellow tint and, when blended with zinc oxide, yields a turbid reddish yellow tint of weak color.

If, before the introduction of the two solutions I and II, 100 cc. of an emulsion of 10 percent strength of a concentrate of sodium alkyl-sulfonamido-acetate (prepared as described in Example 7, but with use of a natural mixture of paraffin hydrocarbons boiling between 200° C. and 300° C.) are added to 3 liters of water, about 71 grams of a dyestuff powder of a more greenish tint and a softer grain are obtained than is the case without the said addition. Apart from the increased quantity of dyestuff powder so obtained, distinctly more transparent tints are produced after grinding the powder with oil, and on admixture with a white pigment, for instance, zinc oxide, distinctly more greenish, purer tints of higher color strength are produced than without the addition.

By varying the proportions of the addition of the said concentrate from, for example, 2 to 10 grams, it is possible to produce various tints ranging from a strong reddish yellow tint to a pure greenish yellow tint. Hitherto, as is known, such a variation could only be secured chemically by varying the dosage of the addition of sodium carbonate.

Moreover, the dyestuff powder thus prepared has the advantage that a smaller proportion of oil is used when the powder is ground with a drying oil.

It is also possible to prepare a mixture from 60 parts of the aforesaid concentrate, 40 parts of spindle oil and 15 parts of water. 2–8 cc. of the mixture so obtained may be added in the form of an emulsion.

With the same success there may be used an alkyl-aryl sulfonate prepared from the aforesaid natural paraffin hydrocarbons, which still contains a small amount of mineral oil.

Instead of the sodium salts, salts of other bases may be used, for example, the salts of triethanolamine or cyclohexylamine. The quantity of mineral oil may be reduced (for example, below 1 percent) or increased (up to 90 percent). It is also possible to introduce the additions directly into solution I.

Example 15

The following solutions are prepared:

I. 180 grams of crystalline zinc sulfate dissolved in 400 cc. of distilled water.
II. 76 grams of calcined sodium carbonate dissolved in 1000 cc. of distilled water.

Solution I is poured into solution II, the solutions are stirred for 10 minutes, then heated to the boil, filtered with suction, and the filter residue is dried at 45° C.–50° C. About 80 grams of zinc carbonate having a hard grain are obtained in this manner. If shortly before running solution I into solution II, 100 parts of an emulsion of 20 percent strength of a concentrate described in Example 14 are added to solution I, about 87 grams of a very soft, loose powder are obtained which, when being ground with a drying oil and spread on a glass plate, exhibits a distinctly stronger covering power than in the absence of the aforesaid addition. This result is also observed in the case of a dyestuff in a colored paint. If, for instance, 3 parts of zinc carbonate are mixed with about 3.5 parts of a yellow azo-dyestuff which is obtained by diazotizing 3.3'-dichlorobenzidine and coupling the diazotized product with aceto-acetic acid ortho-anisidide, and the mixture is ground with about 11 parts of linseed oil, there are obtained purer yellow tints of better covering power than without this addition.

Example 16

A dyestuff is prepared by diazotizing 40.5 parts of 1-amino-2.5-dichlorbenzene and coupling the diazotized product with 70 parts of 2.3-hydroxy-naphthoyl-amino-benzene at a pH value between 3.8 and 6.5.

Before the coupling and before the precipitation of the naphthoyl with an organic or inorganic acid, 6 parts of a clarified mixture of 8 parts of oleic acid methyl tauride of 30–40 percent strength and 75 parts of mineral oil are added to the alkaline naphthol solution. Before introducing the mixture of oil and emulsifying agent into the naphthol solution, it is of advantage to stir the mixture carefully with a little water. By the further addition of water an emulsion of about 5–10 percent strength is prepared which is added to the naphthol solution shortly before the precipitation.

As a result of this addition an extremely loose, very soft dyestuff powder is obtained, which is distinguished by a very good fastness to oil and an excellent fastness to solvents. Without the addition, the coupling of the dyestuff cannot be carried to completion. A further advantage is the improved fastness to splashing and the much purer tints produced after grinding with oil.

Instead of the above mixture, there may be used with the same success, an emulsion of 10 percent strength, which is prepared from 6 parts of a clarified mixture of 8 parts of iso-octyl-phenyl-polyglycol ether (5 mols of ethylene oxide) and 90 parts of peanut oil. There may also be used a clarified mixture which contains, for example, 85 parts of an alkyl-aryl-sulfonate of a high molecular weight and 15 parts of mineral oil. The proportion of mineral oil may be greater or smaller. Instead of the sodium salt of alkyl-aryl-sulfonic acid, salts with other inorganic bases or organic bases may be used.

Furthermore, 4 parts of a mixture consisting of 20 parts of a quaternary ammonium compound of high molecular weight, for example, of a product which is obtained by the hydroxy-ethylation of octadecylamine followed by reaction with dimethyl sulfate, and 80 parts of mineral oil, which is clarified by small additions of olein, ammonia and water, may be used.

Example 17

A dyestuff is prepared by diazotizing 81 parts of 1-amino-2.5-dichlorobenzene, and coupling the diazotized product at about 30° C. and at a pH value between 3.8 and 5.5 with 160 parts of 2.3-hydroxy-naphthoyl-2'-anisidide. Before the coupling and before the precipitation of the naphthol with an organic or inorganic acid, an aqueous emulsion of 15 parts of sodium alkyl-sulffon-amido-acetate, as described in Example 7, is added to the alkaline naphthol solution.

Instead of the aforesaid mixture there may be used a clarified mixture of 85 parts of the triethanol-amine salt of alkyl-phenyl-sulfonic acid and 15 parts of mineral oil.

A very soft, loose powder is obtained which can be very easily worked up.

Example 18

A dyestuff is prepared by diazotizing 48.7 parts of 1-amino-3-methyl-4-chlorobenzene-6-sulfonic acid and coupling the diazotized product at 20° C., and at a pH value between 8.5 and 12 with 32.6 parts of beta-naphthol.

By adding, for example, to the alkaline naphthol solution shortly before the introduction of the diazo-compound, 4 parts of a mixture of 60 parts of oleic acid methyl tauride in the form of a paste of 30–40 percent strength and 40 parts of mineral oil in form of an aqueous emulsion, coupling the dyestuff, making the press cake into a paste with 1.4 litres of water, and running the paste in the course of 20 minutes at about 80° C., into a solution of 210 grams of sodium chloride in 1.8 liters of water, a soft powder is obtained, whereas the powder obtained without the aforesaid addition has a very hard grain.

Instead of the aforesaid mixture, 1.5 parts of sodium alkyl-sulfonamido-acetate, described in Example 7, may be added, for example, in the form of an emulsion of 10 percent strength.

This application is a continuation-in-part of applications Serial Nos. 262,328 filed December 18, 1951 and 396,765 filed December 7, 1953, both now abandoned.

I claim:
1. A process for the manufacture of a water-insoluble, non-aqueous powdered azo-dyestuff pigment having a soft grain, which comprises adding during the coupling operation to form said dyestuff a mineral oil in such a quantity that the mineral oil content of the finished dyestuff ranges from about 3% to about 25% of the dyestuff, and as an emulsifying agent for the mineral oil a sulfonamido acetate of an aliphatic hydrocarbon fraction boiling between about 150° C. and 350° C.

2. A process for the manufacture of a water-insoluble azo-dyestuff pigment having a soft grain as claimed in claim 1, wherein the sulfonamido acetate is used in the form of the sodium salt.

3. A process for the manufacture of a water-insoluble, non-aqueous powdered azo-dyestuff pigment having a soft grain, which comprises adding during the coupling operation to form said dyestuff a mineral oil in such a quantity that the mineral oil content of the finished dyestuff ranges from about 3% to about 5% of the dyestuff, and as an emulsifying agent for the mineral oil a sulfonamido acetate of an aliphatic hydrocarbon fraction boiling between about 150° C. and 350° C.

4. A process for the manufacture of a water-insoluble, non-aqueous powdered azo-dyestuff pigment having a soft grain, which comprises adding during the coupling operation to form said dyestuff a mineral oil in such a quantity that the mineral oil content of the finished dyestuff ranges from about 10% to about 25% of the dyestuff, and as an emulsifying agent for the mineral oil a sulfonamido acetate of an aliphatic hydrocarbon fraction boiling between about 150° C. and 350° C.

5. A process for the manufacture of a water-insoluble azo-dyestuff pigment having a soft grain as claimed in claim 4, wherein the sulfonamido acetate is used in the form of the sodium salt.

References Cited in the file of this patent

UNITED STATES PATENTS

| | | |
|---|---|---|
| 2,009,437 | Coolidge et al. | July 30, 1935 |
| 2,168,888 | Siegel | Aug. 8, 1939 |
| 2,225,960 | Orthner et al. | Dec. 24, 1940 |
| 2,250,098 | Hardt et al. | July 22, 1941 |
| 2,377,172 | Murphy | May 29, 1945 |
| 2,685,494 | Marnon | Aug. 3, 1954 |

FOREIGN PATENTS

| | | |
|---|---|---|
| 517,475 | Great Britain | Jan. 31, 1940 |

OTHER REFERENCES

Surface Active Agents, Schwarts-Perry, 1949, pages 40, 41 and 475.

UNITED STATES PATENT OFFICE
CERTIFICATE OF CORRECTION

Patent No. 2,849,329                         August 26, 1958

Oskar Braun

It is hereby certified that error appears in the printed specification of the above numbered patent requiring correction and that the said Letters Patent should read as corrected below.

In the heading to the printed specification, line 12, for "Claims priority, application Germany December 12, 1952" read -- Claims priority, application Germany December 23, 1950 --.

Signed and sealed this 18th day of November 1958.

(SEAL)
Attest:

KARL H. AXLINE
Attesting Officer

ROBERT C. WATSON
Commissioner of Patents